United States Patent [19]

Hicks

[11] Patent Number: 5,743,045

[45] Date of Patent: Apr. 28, 1998

[54] DRIP PAN FOR HANGING PLANTS

[76] Inventor: Cody C. Hicks, 230 Oviedo St., Gulf Breeze, Fla. 32561

[21] Appl. No.: 713,796

[22] Filed: Sep. 13, 1996

[51] Int. Cl.⁶ .................................................. A01G 9/04
[52] U.S. Cl. ................................................... 47/71
[58] Field of Search ........................... 47/71, 65.5

[56] References Cited

U.S. PATENT DOCUMENTS

| D. 362,829 | 10/1995 | Wagner | D11/164 |
|---|---|---|---|
| D. 363,255 | 10/1995 | Helms et al. | D11/164 |
| D. 367,244 | 2/1996 | Sellers | D11/164 |
| 1,391,353 | 9/1921 | Wells | 47/71 |
| 1,600,055 | 9/1926 | Meyer | |
| 2,120,599 | 6/1938 | Brown | 47/71 |
| 2,605,588 | 8/1952 | Lindstaedt | 47/71 |
| 5,638,638 | 6/1997 | Moskowitz | 47/71 |

FOREIGN PATENT DOCUMENTS

| 2616620 | 12/1988 | France | 47/71 |
|---|---|---|---|
| 3641566 | 6/1988 | Germany | 47/71 |
| 3728621 | 1/1989 | Germany | 47/71 |
| 183127 | 6/1936 | Switzerland | 47/71 |
| 1442026 | 7/1976 | United Kingdom | 47/71 |
| 2189972 | 11/1987 | United Kingdom | 47/71 |

*Primary Examiner*—Dave W. Arola
*Assistant Examiner*—Joanne C. Downs
*Attorney, Agent, or Firm*—Patent & Trademark Services; Joseph H. McGlynn

[57] ABSTRACT

An improved device for collecting excess water from suspended plant pots is described. A pan has a vertical post disposed in the center thereof, said post having on its top end a horizontal, keyed member with radially extending teeth. A lock ring, having a central opening corresponding to the keyed member, is attached to a spacer that is in turn connected to the bottom of a suspended plant pot. The keyed member may pass through the lock ring when the teeth are properly aligned. The pan may be attached to a pot by inserting the keyed member into the lock ring and then rotating the pan.

7 Claims, 1 Drawing Sheet

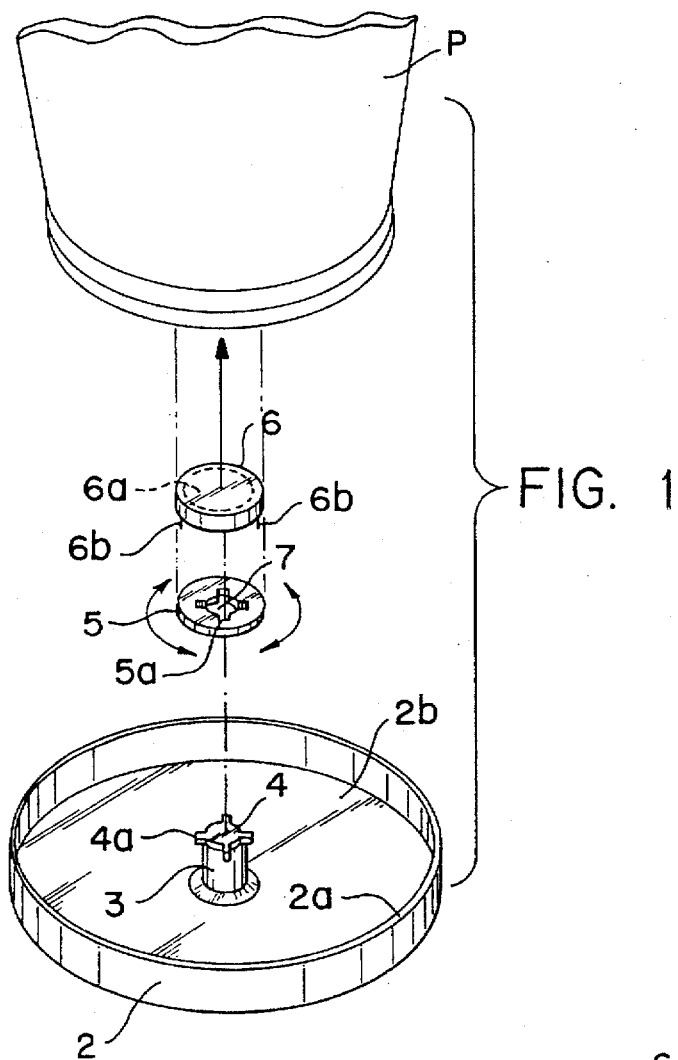
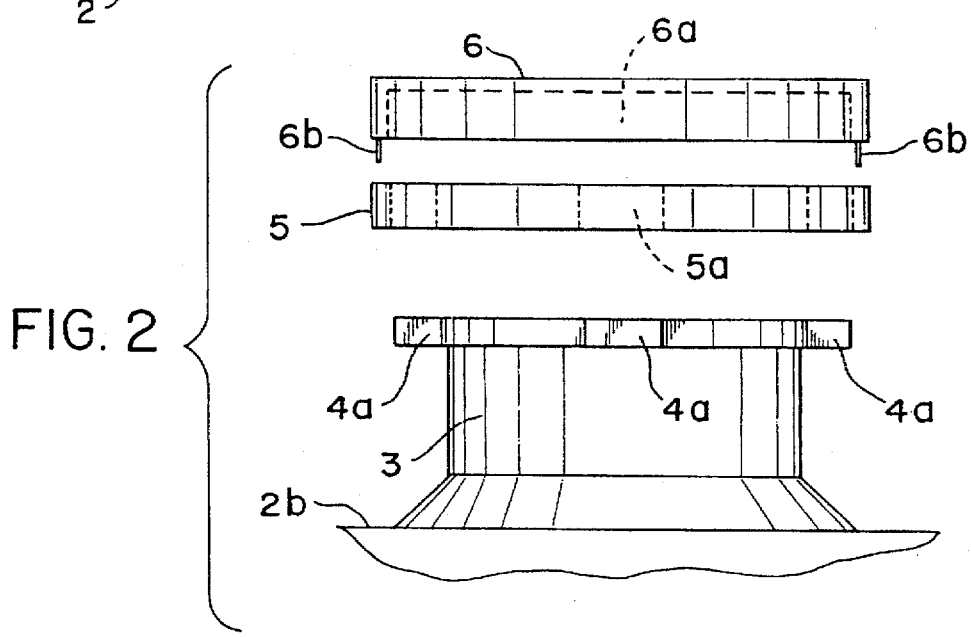

DRIP PAN FOR HANGING PLANTS

BACKGROUND OF THE INVENTION

The present invention relates generally to plant containers, and in particular to a releasably attachable drip pan for collecting excess water from a hanging plant pot.

DESCRIPTION OF THE PRIOR ART

It is a common feature of flower pots and other plant containers to have openings in the bottom and sides thereof, to release excess water from the container and to provide ventilation for the roots. There are known various containers which may be used to collect water runoff from plant pots. As hereinafter described, however, these inventions are not suitable for use with suspended plant pots.

U.S. Pat. No. D. 362,829 discloses an ornamental design for a hanging basket drip pan, comprising hooks for suspension from a hanging plant pot. This invention is bulky and obtrusive, and it cannot be used with differently sized pots.

U.S. Pat. No. 363,255 discloses a saucer-shaped container having legs for supporting a plant pot. This invention is unsuitable for suspended plant pots because it does not provide a means to attach the container to a pot.

U.S. Pat. No. D. 367,244 discloses an oval-shaped saucer for multiple plant groupings. This invention lacks a means to attach to a suspended pot. It is also too obtrusive for use with a single plant pot, since it is elongated to accommodate several plants.

U.S. Pat. No. 1,600,055 describes a saucer for flower pots, having ribbed portions which raise the pot above the bottom of the saucer to provide ventilation. This invention is not suitable for suspended pots because it does not provide a means to attach the saucer to a pot.

There remains a need in the art for a container which may be releasably attached to the bottom of a suspended flower pot to collect excess runoff. There also remains a need for a such a container which can also be used on variously sized plant pots. The present invention, described in detail below, overcomes the disadvantages of the prior art and also affords advantages not heretofore provided by the prior art plant container devices.

SUMMARY OF THE INVENTION

The present invention is an improved drip pan for collecting water runoff from a suspended plant pot, having a releasable locking means for securing the drip pan to the bottom of a pot. The invention comprises a pan with a vertical post disposed in the center thereof. At the top end of the vertical post is a horizontal, keyed member with radially extending teeth. The keyed member engages with a locking mechanism which is secured to the bottom surface of a suspended plant pot. The locking mechanism comprises a ring having a center opening with notches that correspond to the teeth on the keyed member. The ring is connected to a disk that is attached by suitable means to the bottom of a plant pot. A space is provided between the disk and the ring, such that the keyed member may be inserted into the ring and rotated to lock the pan on the bottom of the plant pot. The drip pan may be easily attached to the bottom of virtually any type of suspended plant pot. The locking mechanism further provides a quick and simple means to attach and remove the drip pan. The invention may be constructed from styrene plastic or any other inexpensive, waterproof material.

Accordingly, it is an object of the present invention to provide an improved drip pan for collecting water runoff from a plant pot.

It is a further object of the present invention to provide an improved drip pan which is convenient and inexpensive.

It is still further an object of the present invention to provide an improved drip pan which may be attached to many different types of plant pots.

It is still further an object of the present invention to provide an improved drip pan which may be releasably attached to the bottom of a suspended plant pot.

These and other objects and advantages of the present invention will become fully apparent from the detailed description below, when taken in conjunction with the annexed drawings.

BRIEF DESCRIPTION OF THE DRAWINGS

FIG. 1 shows an exploded, perspective view of the present invention.

FIG. 2 shows an exploded, side elevational view of the locking mechanism of the present invention.

DESCRIPTION OF THE PREFERRED EMBODIMENT

Referring now to the drawings in greater detail, it can be seen in FIG. 1 that the present invention 1 comprises a pan 2 defined by a circular rim 2a and a planar bottom surface 2b. As depicted by the shadow lines in FIG. 1, the pan 2 is attached to the underside of a plant pot P to collect excess water runoff. The preferred means of attachment of the pan 2 to the pot P is described below.

Extending vertically from the center of the pan 2 is a post 3, said post 3 having a horizontally disposed, keyed member 4 attached at its top surface. Keyed member 4 has a number of radially extending teeth 4a. As shown in FIGS. 1 and 2 taken together, the keyed member 4 engages with a lock ring 5. The lock ring 5 has an opening 5a with a plurality of notches 7 that corresponds to the teeth 4a on the keyed member 4, such that the keyed member 4 may pass through the opening 5a when the teeth 4a are rotated to the proper alignment.

The lock ring 5 is attached to a spacer disk 6 that is in turn connected to the underside of a plant pot P. The spacer disk 6 may be connected to the bottom of a plant pot P by any suitable means. For example, if the plant pot P is of clay construction, then the spacer disk 6 may be glued to the pot P with epoxy or rubber cement. The lock ring 5 and the spacer disk 6 may be also be connected to each other by any suitable means, or they could be constructed as a single piece.

As depicted by the dotted lines in FIGS. 1 and 2, the spacer disk 6 has a central hollow portion 6a. As shown best in FIG. 1, the spacer disk 6 may also have downward projections 6b disposed on the underside thereof. The downward projections 6b and the hollow portion 6a serve to provide a space between the lock ring 5 and the spacer disk 6, so that the keyed member 4 may be received into the lock ring 5, as described below.

To attach the pan 2 to the plant pot P, the teeth 4a of the keyed member 4 are aligned to permit insertion into the opening 5a of the lock ring 5. The keyed member 4 is then inserted vertically into the opening 5a until the keyed member 4 passes through the lock ring 5 and comes in contact with the bottom of the spacer disk 6. The pan 2 is then rotated, either clockwise or counterclockwise, as indicated by the directional arrows in FIG. 1. The teeth 4a of the keyed member 4 are thereby rotated out of alignment with the notches 7 and into a locked position, wherein the keyed member 4 cannot pass back through the lock ring 5 until the teeth 4 are realigned. The pan 2 can thus be attached and detached from a suspended pot P by simply rotating the pan 2.

The invention 1 may be constructed from any inexpensive, lightweight, waterproof material. Acceptable materials include, but are not limited to, styrene plastic or aluminum. In use, the invention 1 provides a convenient, attractive, and unobtrusive means to collect water runoff from suspended plant pots.

Although the drip pan and the method of using the same according to the present invention has been described in the foregoing specification with considerable details, it is to be understood that modifications may be made to the present invention which do not exceed the scope of the appended claims and modified forms of this invention done by others skilled in the art to which the invention pertains will be considered infringements of this invention when those modified forms fall within the claimed scope of the invention.

What I claim as my invention is:

1. A drip pan for hanging plants comprising:

container means for collecting excess water runoff at the bottom of a plant pot;

means for releasably connecting said container means to said plant pot;

means for locking said container means to said plant pot; and means for securing said locking means to said bottom of said plant pot, and wherein said means for locking said container means to said plant pot consists of a first disk, and a second disk, said first disk being secured to said plant pot, said second disk being secured to said first disk, said first disk having a central depression formed therein, said second disk having a central aperture formed therein, at least one slot projecting radially from said central aperture in said second disk, said container means having a post attached thereto, said post having at least one tab projecting radially therefrom, said post and said at least one tab adapted to pass through said central aperture and said at least one slot in said second disk and to enter said central depression on said first disk, whereby when said post is turned with respect to said plant pot, said at least one tab is moved out of alignment with said at least one slot and said container means is secured to said plant pot.

2. The drip pan as claimed in claim 1, wherein said container means for collecting said water runoff at said bottom of said plant pot is a pan of substantially circular configuration, having a substantially circular rim, a planar bottom surface, and sufficient depth to collect a quantity of said water runoff.

3. The drip pan as claimed in claim 1, wherein said means for releasably connecting said container means to said plant pot is a post, said post having at least one radially extending tooth, said post projecting upward from a center of said container means, said post interengaging with two disks attached to said plant pot.

4. The drip pan as claimed in claim 1, wherein said post is unitary with said container means.

5. The drip pan as claimed in claim 1, wherein said first disk and said second disk are integral with said plant pot.

6. The drip pan as claimed in claim 1, wherein one of said first disk and said second disk have projections on a surface which faces the disk without projections, and said projections engage said surface to space said disks from each other.

7. The drip pan as claimed in claim 1, wherein said post has a plurality of tabs, and said second disk has a plurality of slots to receive said tabs.

* * * * *